Figure 1:
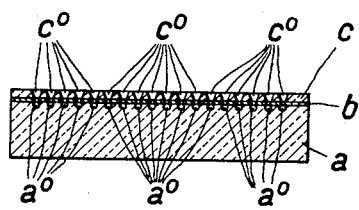

April 18, 1933.   W. HENKEL ET AL   1,904,139
METHOD OF MAKING SELENIUM CELLS
Filed Dec. 28, 1929

Inventors:
Wilhelm Henkel.
Franz Meyer

Patented Apr. 18, 1933

1,904,139

UNITED STATES PATENT OFFICE

WILHELM HENKEL AND FRANZ MEYER, OF JENA, GERMANY, ASSIGNORS TO THE FIRM CARL ZEISS, OF JENA, GERMANY

METHOD OF MAKING SELENIUM CELLS

Application filed December 28, 1929, Serial No. 417,218, and in Germany January 7, 1929.

Selenium cells having the selenium provided on two interlaced platinum electrodes attached to the glass base have been suggested already. In order to permit the two electrodes to be properly cut from a continuous platinum layer and with a view to provide a good adhesion of the selenium to the glass, these cells have in the glass and between the two electrodes a groove filled with selenium. According to this well-known proposal the groove is scratched into the said glass base by means of a diamond. Experience proved, however, that the scratched-in grooves turn out too broad and irregular and, in order to avoid this, the bases were chosen of a softer material, e. g. slate and raw steatite, which allow of being scratched in a more simple manner and afford the selenium a better adhesion than smooth glass surfaces. However, owing to the insufficient homogeneity of slate and steatite and the fact that this material frequently has electrically conductive spots and harder parts, cells with such softer material would not lend themselves to the purpose in a very satisfactory way.

The present invention follows up the advantage offered by the hardness of a glass base, which if so desired may be replaced by one of quartz, and makes it possible to obtain especially good cells by etching between the two electrodes and into the base a groove wherein the selenium comes into contact with the base. This method makes it possible to give the cells a specially finely subdivided platinum layer; it permits the electrodes to adhere tightly to the base also after the subdivision, and affords them to be completely separated from each other. The said complete separation does away with any conducting bridges from the one electrode to the other. When etching the glass or quartz surface with which the selenium comes into touch, the said surface can be sufficiently roughened so as to provide also for the selenium a good adhesion to the base.

According to the invention a cell is made in the following manner: A smooth surface of the glass base is provided with a layer of platinum which, in its turn, is covered with a protective layer of an easily removable substance, for example wax. Now, e. g. by etching, a groove corresponding to the separating line of the two electrodes is worked into the protective layer and along the said groove another one is etched into the platinum layer and the base by means of hydrofluoric acid. The platinum layer can be provided on the base in the well-known manner, e. g. by cathodic sputtering. The most convenient way is, however, to provide the platinum layer by burning a platinum solution onto the glass, a procedure which permits of a particularly close connection of the glass and platinum and affords the etching of the platinum layer to be made with good success especially in respect of the method described in the second place.

Selenium cells having grooves etched into a glass base have already been suggested. However, these well-known selenium cells had their grooves filled with platinum, and no grooves were left for the selenium.

Figure 2:
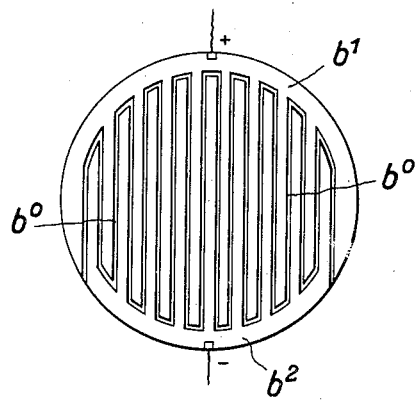

Of the accompanying drawing Figures 1 and 2 represent in a section through the cell and in a view, respectively, the development of a cell whose groove is etched after the platinum has been provided.

The base, which in this case is of glass, is denominated $a$ throughout. The cell according to Figures 1 and 2 has burnt in on the base $a$ a continuous platinum layer $b$ (compare Figure 1) which is to be divided by zigzag line $b^0$ into two interlacing parts, $b^1$ and $b^2$, forming the electrodes (compare Figure 2). For this purpose the continuous layer $b$ is provided with a wax layer $c$ in which a groove $c^0$ is engraved in accordance with the line $b^0$. The base $a$ which, now, is provided with the platinum and wax layers, is immersed in hydrofluoric acid which causes a groove $a^0$ to be etched below the groove $c^0$ into the platinum layer $b$ and the base. Now the wax layer has to be removed and the base $a$ wiped off, and the platinum layer is divided in such a way that bridges or frayings between the electrodes are safely avoided. The selenium (which is not shown in the drawing) is provided on the electrodes $b^1$ and $b^2$ in the well-known manner, whereupon it fills the groove $a^0$ and sticks tightly therein.

We claim:

A method of making selenium cells consisting therein that a platinum layer is burnt in on one side of a glass plate, that this platinum layer is covered with an easily fusible substance, that a groove is worked into the said substance and that, then, along the said groove a groove is etched into the platinum and the glass by means of hydrofluoric acid, whereupon the said substance is removed and, finally, the groove filled with selenium.

WILHELM HENKEL.
FRANZ MEYER.